US009680619B2

(12) United States Patent
Ro et al.

(10) Patent No.: US 9,680,619 B2
(45) Date of Patent: Jun. 13, 2017

(54) METHOD AND APPARATUS FOR OPERATING SOUNDING IN WIRELESS COMMUNICATION SYSTEM IN WHICH UPLINK CONTROL CHANNEL RESOURCE DYNAMICALLY CHANGES

(71) Applicant: Samsung Electronics Co., Ltd., Suwon-si, Gyeonggi-do (KR)

(72) Inventors: Sangmin Ro, Seoul (KR); Joonyoung Cho, Suwon-si (KR); Juho Lee, Suwon-si (KR); Hyoungju Ji, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

(21) Appl. No.: 14/418,232

(22) PCT Filed: Aug. 30, 2013

(86) PCT No.: PCT/KR2013/007813
§ 371 (c)(1),
(2) Date: Jan. 29, 2015

(87) PCT Pub. No.: WO2014/035180
PCT Pub. Date: Mar. 6, 2014

(65) Prior Publication Data
US 2015/0195063 A1    Jul. 9, 2015

(30) Foreign Application Priority Data
Aug. 31, 2012 (KR) .......................... 10-2012-0096241

(51) Int. Cl.
*H04W 72/04*    (2009.01)
*H04L 5/00*    (2006.01)

(52) U.S. Cl.
CPC ............ *H04L 5/005* (2013.01); *H04L 5/0042* (2013.01); *H04L 5/0051* (2013.01);
(Continued)

(58) Field of Classification Search
None
See application file for complete search history.

(56) References Cited

U.S. PATENT DOCUMENTS

2009/0181687 A1\*  7/2009  Tiirola .................. H04L 5/0048
455/450
2010/0091708 A1\*  4/2010  Nishikawa ........ H04W 72/0413
370/328

(Continued)

OTHER PUBLICATIONS

ZTE, Remaining Open issues of Simultaneous transmission of UL Channels/Signals, R1-110165, 3GPP TSG RAN WG1 Meeting #63bis, Jan. 17-21, 2011, p. 1-3, Dublin, Ireland.

(Continued)

*Primary Examiner* — Bunjob Jaroenchonwanit
(74) *Attorney, Agent, or Firm* — Jefferson IP Law, LLP

(57) ABSTRACT

The present invention relates to a procedure for transceiving a sounding reference signal and to a method for operating sounding in a wireless communication system in which an uplink control channel resource dynamically changes. More particularly, the method for transmitting a sounding reference signal by a terminal in a wireless communication system according to the present invention comprises the steps of: receiving uplink/downlink configuration information transmitted from a base station; checking whether a conflict occurs between a physical uplink control channel (PUCCH) resource region based on the uplink/downlink configuration information and a sounding reference signal (SRS); and skipping the transmission of the SRS upon the occurrence of a conflict. The present invention has the advantage of efficiently solving the problem of conflicts (Continued)

between the SRS and the uplink control channel resource without increasing the power consumption burden in the terminal or without excessive restrictions on an SRS transmission subframe or sounding band.

16 Claims, 13 Drawing Sheets

(52) U.S. Cl.
CPC .......... *H04L 5/0053* (2013.01); *H04L 5/0062* (2013.01); *H04W 72/0413* (2013.01)

(56) References Cited

U.S. PATENT DOCUMENTS

| | | | |
|---|---|---|---|
| 2011/0013546 A1 | 1/2011 | Hao et al. | |
| 2012/0182857 A1* | 7/2012 | Bertrand | H04J 13/0062 370/210 |
| 2012/0218967 A1* | 8/2012 | Noh | H04W 24/00 370/329 |
| 2013/0188516 A1* | 7/2013 | He | H04W 28/16 370/254 |
| 2013/0195084 A1* | 8/2013 | Chen | H04W 72/0413 370/336 |
| 2013/0272232 A1* | 10/2013 | Dinan | H04W 52/386 370/329 |

OTHER PUBLICATIONS

Texas Instruments, Outstanding resource allocation issues for PUCCH Format 3, R1-105887, 3GPP TSG RAN WG1 #63, Nov. 15-19, 2010, p. 1-4, Jacksonville, USA.

Huawei et al., SRS on PUCCH-less carrier, R1-122521, 3GPP TSG RAN WG1 Meeting #69, May 21-25, 2012, p. 1-4, Prague, Czech Republic.

Alcatel-Lucent et al., Remaining issues for SRS for CoMP, R1-123144, 3GPP TSG RAN WG1 Meeting #70, Aug. 13-17, 2012, p. 1-5, Qingdao, China.

* cited by examiner

FIG. 5
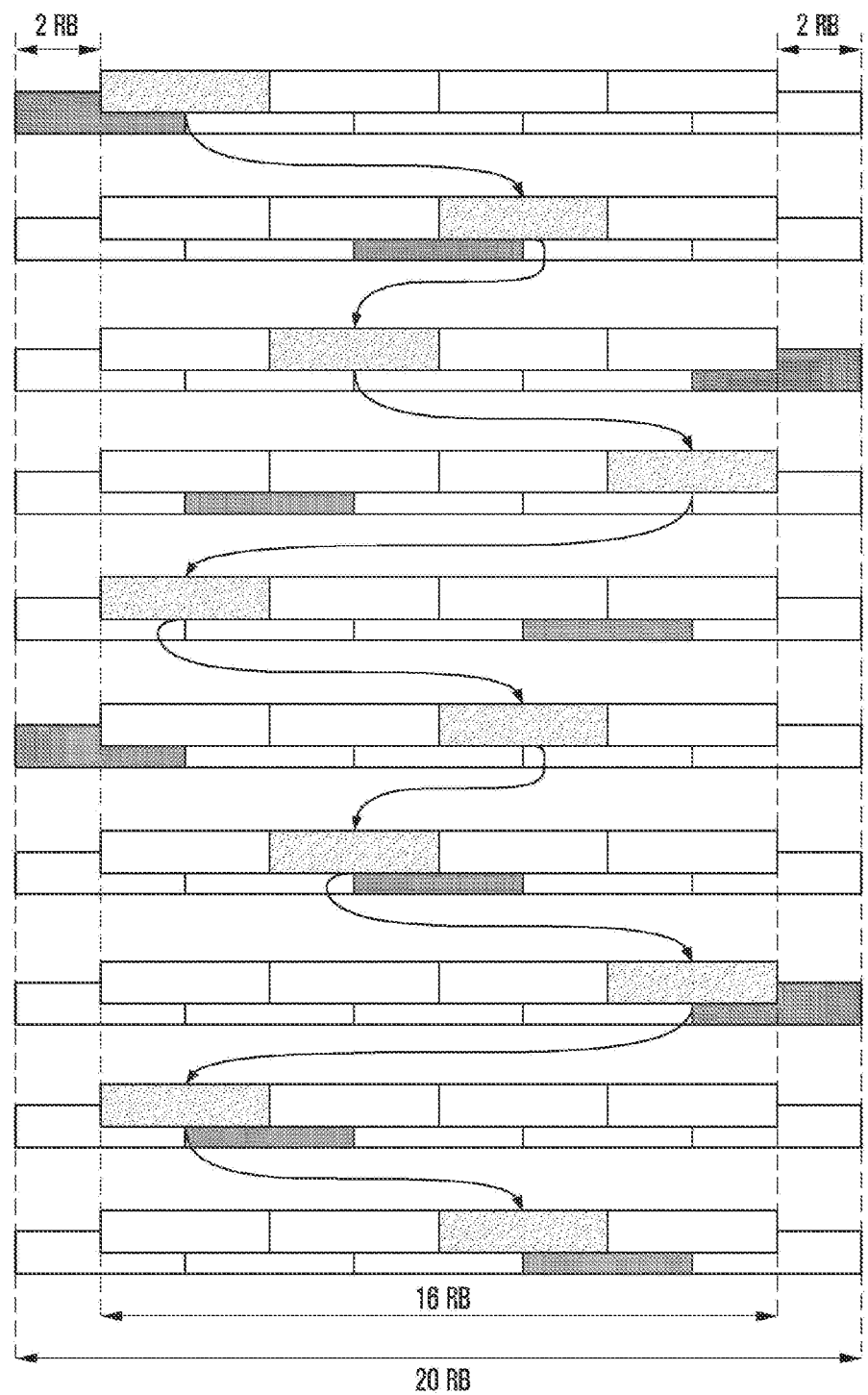
 SRS from Ignorant UE (500)
 SRS from knowing UE (501)

METHOD AND APPARATUS FOR OPERATING SOUNDING IN WIRELESS COMMUNICATION SYSTEM IN WHICH UPLINK CONTROL CHANNEL RESOURCE DYNAMICALLY CHANGES

TECHNICAL FIELD

The present invention relates to a sounding management method and, in particular, to a sounding reference signal transmission procedure and sounding management method for use in the wireless communication system in which uplink control channel resource varies dynamically.

BACKGROUND ART

Mobile communication systems were developed to provide the subscribers with voice communication services on the move. With the rapid advance of technologies, the mobile communication systems have evolved to support high speed data communication services beyond the early voice-oriented services. However, the limited resource and user requirements for higher speed services in the current mobile communication system spur the evolution to more advanced mobile communication systems.

Meanwhile, the mobile communication systems adopt traffic adaptation techniques to adjust the system communication resource dynamically according to the change of the required traffic amount to process the traffic efficiently. In the case of the Long Term Evolution (LTE) system of the $3^{rd}$ Generation Partnership Project (3GPP) as an asynchronous mobile communication standardization organization, the numbers of downlink and uplink subframes are configured at various ratios in a radio frame in Time Division Duplex (TDD) mode. This configuration is called uplink/downlink configuration, and the numbers of the downlink and uplink subframes in one radio frame change depending on the uplink/downlink configuration. The LTE TDD system uses the traffic adaptation technique of selecting/adopting the uplink/downlink configuration dynamically depending on the change of the required downlink and uplink traffic amounts so as to use the radio communication resource efficiently, resulting in improvement of throughput.

FIG. 1 is a diagram illustrating an exemplary traffic adaptation technique based on a plurality of uplink/downlink configurations in the LTE TDD system.

In this example, it is assumed that the system performs traffic adaptation with three Uplink/Downlink (UL/DL) configurations. Assuming that the three UL/DL configurations are UL/DL conf#0 100, UL-DL conf#1 101, and UL/DL conf#2; the UL/DL configurations have different UL/DL subframe ratio in the radio frame spanning 10 ms. Here, a subframe spans 1 ms.

For example, the UL-DL conf#0 100 consists of 2 DL subframes (D), 2 special subframe (S), and 6 UL subframes. Meanwhile, the UL/DL config#2 102 consists of 6 DL subframes (D), 2 special subframes (S), and 2 UL subframes (U). Among the three UL/DL configurations, the UL/DL conf#2 having the largest number of DL subframes is regarded as the DL heaviest configuration 103.

In the case of performing the traffic adaptation by applying the three configurations 100, 101, and 102 dynamically, there is a need of determining uplink transmission timing of Hybrid Automatic Repeat Request (HARQ) ACK/NACK corresponding to downlink data. In the example of FIG. 1, it is assumed to comply with the HARQ ACK/NACK UL transmission timing of the configuration 102. This is because the configuration 102 has the least number of UL subframes among the three configurations and thus the other two configurations are likely to have the UL timings at the same uplink subframes as the configuration 102, thereby avoiding a problem in that the UL subframe for transmitting the HARQ ACK/NACK is changed to DL subframe in the traffic adaptation process.

In LTE TDD, the HARQ ACK/NACK corresponding to DL data is transmitted at the UL subframe at least after 4 subframes since the transmission timing of the DL data. Accordingly, when complying with the HARQ ACK/NACK transmission timing of the configuration 102, the HARQ ACK/NACK corresponding to the DL data transmitted in the time duration 104 is transmitted at the UL subframe (U) 105.

At the UL subframe 105, the HARQ ACK/NACK is transmitted on the Physical Uplink Control Channel (PUCCH). In this case, the frequency resource of the PUCCH is extended from the edge frequency region to the center direction of the UL system bandwidth as the required PUCCH resource amount increases. When the traffic adaptation is performed dynamically, the PUCCH HARQ ACK/NACK resource is configured under the assumption with the assumption of the DL heaviest configuration 103; however, if non-DL heaviest configuration is applied, the PUCCH resource region is configured larger than required, resulting in resource waste.

In the example of FIG. 1, it is assumed that efficient resource utilization is pursued by changing the PUCCH HARQ ACK/NACK resource amount dynamically according to the UL/DL configuration. The PUCCH resource regions for transmitting the HARQ ACK/NACK corresponding to the DL data transmitted at the special subframe (S) and the DL subframe (D) proceeding the special subframe (S) are denoted by reference numbers 06 and 107. As shown in FIG. 1, the regions 106 and 107 are the frequency regions arranged in sequence from the edge of the uplink system bandwidth. The two subframes are shared in common among the configurations 110, 101, and 102 so as to be present always in the traffic adaptation process. Accordingly, the PUCCH HARQ ACK/NACK resource corresponding thereto is also present always in the traffic adaptation process as configured at the beginning of the PUCCH resource.

However, the DL subframe (D) located two subframes before the special subframe (S) present only in the configurations 101 and 102. Since the DL subframe which is not present in the configuration 100 is added, the number of DL data channels supported in the configurations 101 and 102 increases as compared to the configuration 100. Accordingly, the PUCCH HARQ ACK transmission resource region has to increase as much as the increased DL data channel amount. Here, the increased PUCCH HARQ ACK/NACK resource region is denoted by reference number 108. The PUCCH resource region increased due to the DL subframe (D) is configures at part more inside than the original PUCCH regions 107 and 107. Finally, the DL subframe (D) located three subframes before the special subframe (S) is present only in the configuration 102. The PUCCH HARQ ACK/NACK resource region which is added due to this DL subframe is denoted by reference number 109. Since the PUCCH resource region corresponding to the this DL subframe (D) is configured in addition to the regions 106, 107, and 108, it is located at most inside part of the PUCCH region. Finally, a Physical Uplink Shared Channel (PUSCH) 110 for UL data transmission is present between the PUCCH regions.

On the UL resource for transmitting the PUCCH HARQ ACK/NACK, the Sounding Reference Signal (SRS) for UL band channel estimation is transmitted as well as PUSCH. The base station performs frequency-selective scheduling, power control, and timing estimation based on the channel state information acquired based on the SRS transmitted by each terminal. The SRS is generated based on the Zadoff-chu sequence, and the SRS resource per terminal is split into frequency location including comb and cyclic shift of the Zadoff-chu sequence. Here, the comb is SRS transmission resource split into even-numbered subcarrier (comb 0) and odd-numbered subcarriers (comb 1). The SRS is transmitted at the subframe configured for SRS transmission at the last symbol in the time domain.

DISCLOSURE OF INVENTION

Technical Problem

In order to facilitate the traffic adaptation technique, the communication resource has to be configured dynamically. If the communication resource is configured statically, it is difficult to reflect the change of traffic properly and thus the traffic adaptation effect decreases. When the dynamic traffic adaptation is performed, it is preferred that the PUCCH resource region for transmitting the HARQ ACK/NACK corresponding to the DL data varies dynamically according to the change of the number of DL subframes to utilize the resource efficiently.

However, the common cell configuration for the SRS transmission resource is delivered to the UE within the cell through the system information which is not transmitted dynamically. Accordingly, the SRS configuration for the cell does not reflect the dynamic change of the PUCCH resource in the dynamic traffic adaptation mode, resulting in collision between PUCCH and SRS.

In order to solve the above problem, it can be considered to apply a shortened PUCCH format for use in transmitting the SRS and PUCCH simultaneously. The shortened PUCCH is the format designed to do not use the last symbol duration of the subframe carry SRS.

However, since the shortened PUCCH is short as compared to the normal PUCCH, it is necessary to use higher transmit power for transmitting the shortened PUCCH as compared to the normal PUCCH in order to fulfil the same level PUCCH decoding performance.

This may increases the power consumption load of the terminal so as to cause a problem that that terminal falls into the transmission power restriction state. Particularly in a carrier aggregation mode, there may be a scenario requiring supportability of UL transmission through multiple carriers or simultaneous uplink transmission to macro and pico base stations. Since the power consumption of the terminal is more sensitive issue in such an environment, the shortened PUCCH format is not a preferable solution for the problem.

In the case of applying the method of configuring the SRS transmission band to be narrow to avoid collision with the PUCCH region, this causes a problem in that the UL sounding available band is restricted.

The present invention has been conceived to solve the above problem and aims to provide an SRS management method and apparatus that is capable of overcoming the problem of collision between the SRS and other uplink control channel resources efficiently in the wireless communication system characterized by the uplink control channel resource varying dynamically.

Solution to Problem

In accordance with an aspect of the present invention, an SRS management method in a wireless communication system includes configuring, at a base station, different sounding bands to an uplink control channel dynamic change recognition-capable terminal (e.g. traffic adaptation-capable terminal) and an uplink control channel dynamic change recognition-incapable terminal (e.g. traffic adaptation-incapable terminal).

Preferably, the method further includes configuring a sounding band to the uplink control channel dynamic change recognition-capable terminal under the assumption of the least uplink channel resource region (e.g. assumption of UL heaviest configuration) and a sounding band to the uplink control channel dynamic change recognition-incapable terminal under the assumption of the largest uplink channel resource region (e.g. assumption of DL heaviest configuration).

Preferably, the method further includes determining the control channel resource region according to a rule or definition agreed between the base station and the terminal to correspond to the UL/DL resource configuration for traffic adaptation.

Preferably, the sounding band configuration information is transmitted from the base station to the respective terminals through a cell-common or terminal-specific Radio Resource Control (RRC) signaling. The configuration informs of the sounding bands of the respective dynamic change recognition-capable terminal and dynamic change recognition-incapable terminal with the individual field values. It is also possible to notify of the configuration value for one type terminal and the configuration value for the other type terminal using an offset value. It is also possible to apply a rule predetermined between the configuration value for one type terminal and the configuration value for another type terminal (e.g. if the configuration value for one type terminal is determined, the configuration value for the other type terminal is determined depending thereon.

Preferably, the method further includes receiving, at the uplink control channel dynamic change recognition-capable terminal, the sounding band configuration for the uplink control channel dynamic change recognition-capable terminal, transmitting SRS according to the corresponding configuration, receiving, at the uplink control channel dynamic change recognition-incapable terminal, the sounding band configuration for the uplink control channel dynamic change recognition-incapable terminal, and transmitting the SRS according to the corresponding configuration.

In accordance with another aspect of the present invention, an uplink control channel dynamic change recognition-capable terminal in a wireless communication system includes receiving UL/DL configuration of a radio frame from a base station, determining whether a PUCCH region according to the configuration is overlapped with SRS, skipping, when the PUCCH region is not overlapped with the SRS, transmission of the SRS, and transmitting, when the PUCCH region is overlapped with the SRS, the SRS. If the SRS transmission is skipped, this means the SRS transmission is dropped. This expression may be used interchangeably with not transmitting the corresponding SRS.

Preferably, the base station includes transmitting UL/DL configuration information to the terminals within a cell, determining whether the PUCCH region according to the configuration is overlapped with the SRS of a specific dynamic change recognition-capable terminal, skipping, when the PUCCH region is overlapped with the SRS, transmission of the SRS, and transmitting, when the PUCCH region is not overlapped with the SRS, the SRS. If the SRS transmission is skipped, this means the SRS transmission is dropped. This expression may be used interchangeably with not transmitting the corresponding SRS.

In accordance with another aspect of the present invention, the dynamic change recognition-capable terminal in a wireless communication system includes determining whether its SRS and uplink control channel are scheduled simultaneously or in the same subframe, skipping, transmission of the SRS when SRS and uplink control channel are scheduled simultaneously or in the same subframe, and transmitting the SRS when the SRS and uplink control channel are not scheduled simultaneously or in the same subframe.

In accordance with an aspect of the present invention, a sounding reference signal transmission method of a terminal in a wireless communication system includes receiving uplink/downlink configuration transmitted by a base station, determining whether Physical Uplink Control Channel (PUCCH) resource region according to the uplink/downlink configuration is overlapped with a Sounding Reference Signal (SRS), skipping, when the PUCCH resource region is overlapped with the SRS, transmission of the SRS.

In accordance with another aspect of the present invention, a terminal for transmitting a sounding reference signal in a wireless communication system includes a transceiver which transmits/receives signals to and from a base station and a control unit which controls the transceiver to receive uplink/downlink configuration transmitted by a base station, determines whether Physical Uplink Control Channel (PUCCH) resource region according to the uplink/downlink configuration is overlapped with a Sounding Reference Signal (SRS), and controls to skip SRS transmission.

In accordance with another aspect of the present invention, a sounding reference signal reception method of a base station in a wireless communication system includes transmitting uplink/downlink configuration to a terminal, determining whether Physical Uplink Control Channel (PUCCH) resource region according to the uplink/downlink configuration is overlapped with a Sounding Reference Signal (SRS), and skipping, when the PUCCH resource region is overlapped with the SRS, reception of the SRS.

In accordance with still another aspect of the present invention, a base station for receiving a sounding reference signal in a wireless communication system includes a transceiver which transmits/receives signals to and from a terminal and a control unit which controls the transceiver to transmit uplink/downlink configuration to a terminal, determines whether Physical Uplink Control Channel (PUCCH) resource region according to the uplink/downlink configuration is overlapped with a Sounding Reference Signal (SRS), and controls to skip, when the PUCCH resource region is overlapped with the SRS, receiving the SRS.

Advantageous Effects of Invention

The present invention configures different sounding bands to the UL control channel resource dynamic change recognition-capable terminal and incapable terminal. Particularly, the present invention configures the sounding band to the capable terminal under the assumption of the least UL control channel resource region and to the incapable terminal under the assumption of the largest UL control channel resource region.

In this way, it is possible to avoid collision between the SRS transmission resource region of the dynamic change recognition-capable terminal and other UL control channel resource region. The present invention provides a method for facilitating the sounding operation while minimizing the restricting of the sounding region to the dynamic change recognition-capable terminal supporting traffic adaptation to improve traffic efficiency.

The dynamic change recognition-capable terminal determines whether to transmit SRS depending on whether the UL control channel region collides with its own SRS transmission so as to avoid the collision between the SRS and UL control channel.

Finally, the present invention is advantageous in terms of neither increasing power consumption load of the terminal to avoid the collision between the SRS and uplink the control channel like the shortened PUCCH scheme and nor requiring excessive restriction for SRS configuration (e.g. SRS transmission subframe and sounding band).

BRIEF DESCRIPTION OF DRAWINGS

FIG. 5 is a diagram illustrating exemplary known UE and ignorant UE SRS multiplexing on the radio communication UL control channel resource according to an embodiment of the present invention;

MODE FOR THE INVENTION

Exemplary embodiments of the present invention are described with reference to the accompanying drawings in detail. Detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

A description is made of the sounding reference signal transmission/reception procedure and sounding management method in a wireless communication system in which UL control channel resource varies dynamically hereinafter. In the following description, it is assumed that the shortened PUCCH format use is not configured.

Figure 1:
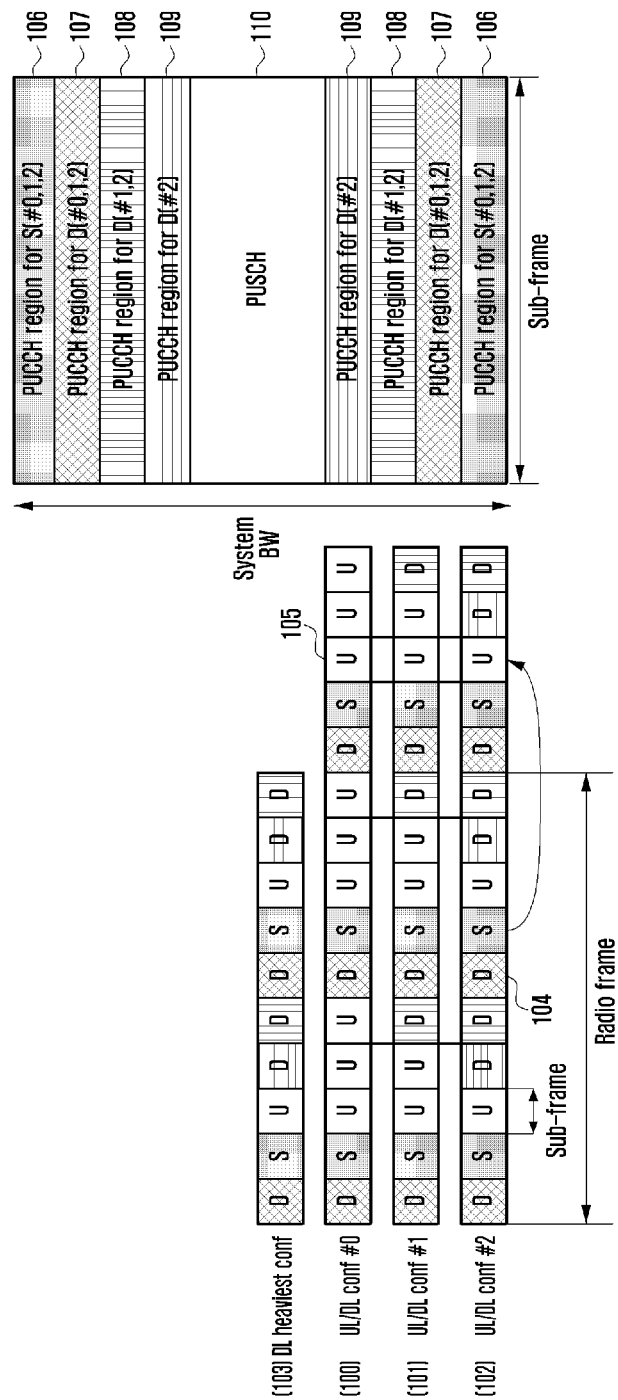
FIG. 1 is a diagram illustrating an exemplary traffic adaptation technique based on a plurality of uplink/downlink configurations in the LTE TDD system.
Figure 2:
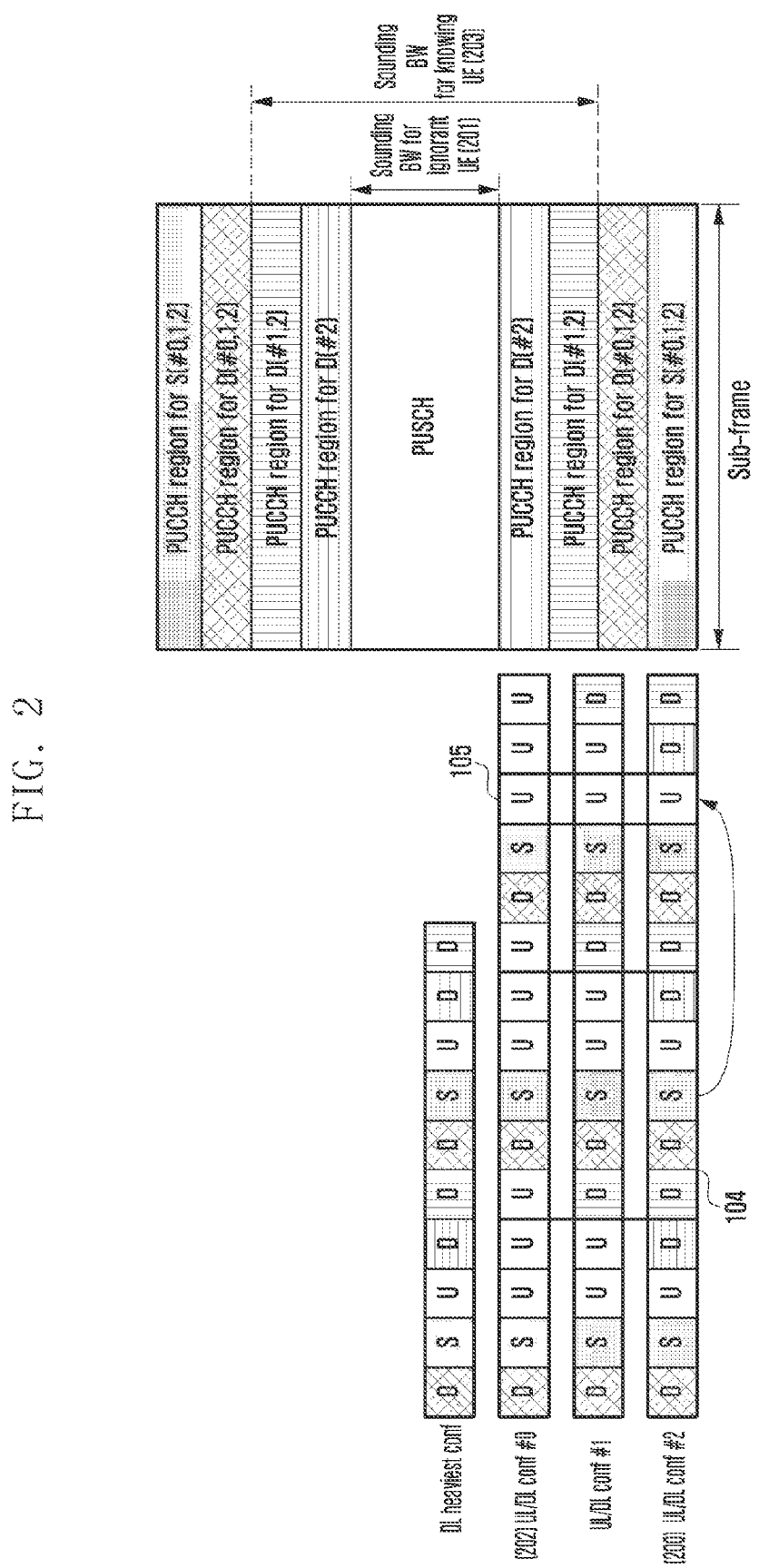
FIG. 2 is a diagram illustrating sounding bands for a knowing UE and an ignorant UE in a wireless communication system according to an embodiment of the present invention.

FIG. 2 is a diagram illustrating a base station operation of configuring the respective sounding bands for the UL control channel resource dynamic change recognition-capable terminal ("knowing UE" in FIG. 2 or "first type UE" are used interchangeably) and the recognition-incapable terminal ("ignorant UE" or in FIG. 2 or "second type UE" are used interchangeably) in a wireless communication system according to an embodiment of the present invention.

As shown in FIG. 2, the sounding band is configured under the assumption of the largest UL control channel resource region. This means assuming the DL heaviest configuration 200 a thus the PUCCH resource region related to the configuration 200, i.e. the PUCCH resource region marked with #2 in FIG. 2, are excluded from the sounding region. As a result, the sounding band of the ignorant UE is configured as denoted by reference number 201. That is, the ignorant UE is allocated the resource region excluding the PUCCH resource region required according to the UL/DL configuration including the largest number of DL subframes as the sounding band.

Meanwhile, the knowing UE is allocated the sounding band under the assumption of the least UL control channel resource region. This means assuming the UL heaviest configuration 202 and thus the PUCCH resource region related to the configuration 202, i.e. the PUCCH resource region marked with #0 and #1 are excluded from the sounding region. As a result, the knowing UE is allocated the resource region excluding the PUCCH resource region required according to the UL/DL configuration including the largest number of UL subframes as the sounding band.

The PUCCH resource region related to each UL/DL configuration is determined according to a rule agreed between the base station and the terminal. This rule may be defined as a function calculating the PUCCH resource region according to the UL/DL configuration or a table providing fixe mappings.

In the current 3GPP standard, a parameter m is defined as the frequency location of the PUCCH, i.e. the Resource Block (RB) index of PUCCH. Here, the RB is a resource allocation unit consisting of 12 subcarriers. The parameter 'm' is defined a different function depending on the type of the information transmitted on PUCCH, i.e. HARQ ACK/NACK and Channel Quality Indicator (CQI). Particularly in the case of the PUCCH format for transmitting HARQ ACK/NACK, the cyclic shift of the sequence for Code Division Multiplexing (CDM) configured in the system and the index of PUCCH resource carrying the HARQ ACK/NACK are used as the input of the function. Particularly, the index of the PUCCH resource carrying the HARQ ACK/NACK is linked to the least index of the resource to which the DL control channel for scheduling the DL data related to the corresponding ACK/NACK is mapped (e.g. the least index of the Control Channel Element (CCE) to which the corresponding DL control channel is mapped).

In the present invention, the base station adjust the input parameter of the function determining m to have different ranges of m for the respective UL/DL configurations so as to configure per-UL/DL configuration PUCCH HARQ ACK/NACK resource regions differently.

Also, it is possible to define a new function of m with a new input variable such as the numbers of DL subframes and special subframes or UL/DL and special subframe ratio in one radio frame of the UL/DL configuration instead of the input parameter specified in the current standard. Finally, the per-UL/DL configuration ranges of m agreed between the base station and UE may be used.

If there is a mismatch between the PUCCH resource region defined based on the value 'm' and the PUCCH resource region related to the UL/DL configuration, it is possible to comply with the PUCCH resource region configuration related to the UL/DL configuration with priority.

The sounding band configuration may be transmitted from the base station to each UE through cell-common or UE-specific Radio Control Channel (RRC) signaling. This configuration may be informed with independent field values corresponding to the sounding bands for the knowing and ignorant UEs. It is also possible to notify of the configuration value for one type UE and the configuration value for the other type UE using an offset value. It is also possible to determine the configuration value for one type UE depending on the configuration value for the other type UE.

In the present invention, the knowing UE receives the sounding band configuration for the knowing UE from the base station to transmit SRS based thereon. The ignorant UE receives the sounding band configuration for the ignorant UE from the base station to transmit SRS based thereon.

Figure 3:
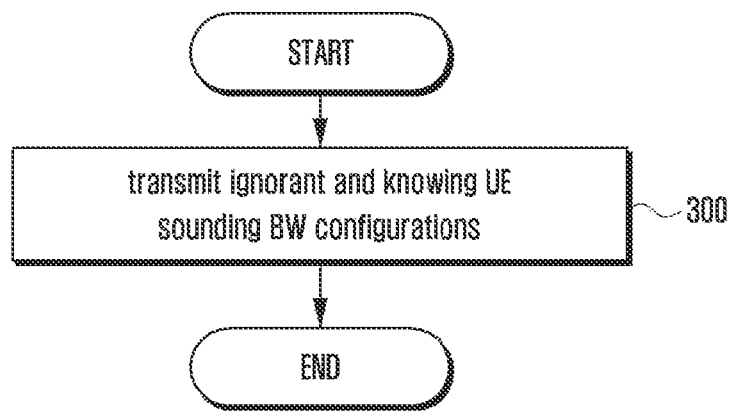
FIG. 3 is a flowchart illustrating the base station operation procedure of transmitting the sounding band configuration information to the UE in a wireless communication system according to an embodiment of the present invention.

FIG. 3 is a flowchart illustrating the base station operation procedure of transmitting the sounding band configuration information to the UE in a wireless communication system according to an embodiment of the present invention.

Referring to FIG. 3, the base station transmits the sounding band configuration information for the UL control channel resource dynamic change recognition-capable UE ("knowing UE" in FIG. 3 or first type UE) and incapable UE ("ignorant UE" in FIG. 3 or second type UE). As described above, the configuration information may be transmitted to the respective UEs within the cell through the cell-common or UE-specific RRC signaling. Afterward, the base station ends the algorithm according to the present invention.

Figure 4:
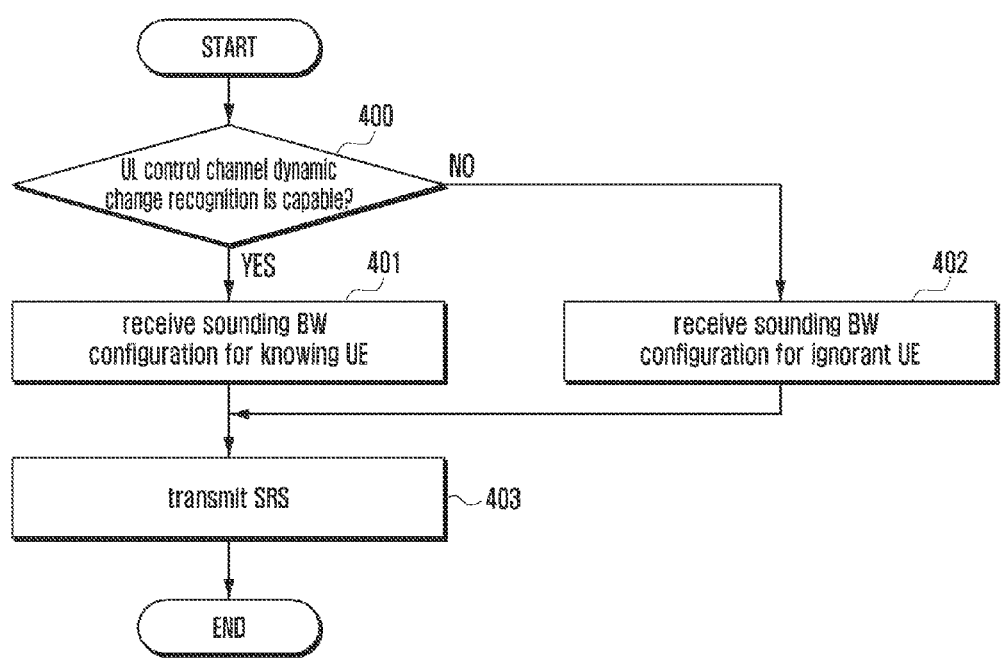
FIG. 4 is a flowchart illustrating the UE operation procedure of receiving the sounding band configuration information from the base station and transmitting SRS to the base station in the wireless communication system according to an embodiment of the present invention.

FIG. 4 is a flowchart illustrating the UE operation procedure of receiving the sounding band configuration information from the base station and transmitting SRS to the base station in the wireless communication system according to an embodiment of the present invention.

Referring to FIG. 4, the UE operates differently depending on whether it is a knowing UE at step 400. If the UE is a knowing UE, the knowing UE receives the sounding band configuration information for the knowing UE from the base station at step 401.

Otherwise if the UE is an ignorant UE, the ignorant UE receives the sounding band configuration information for the ignorant UE at step 402.

At step 403, the UE transmits SRS to the base station according to the sounding band configuration information received at the previous step.

Afterward, the UE ends the algorithm according to the present invention.

FIG. 5 is a diagram illustrating exemplary known UE and ignorant UE SRS multiplexing on the radio communication UL control channel resource according to an embodiment of the present invention.

In FIG. 5, it is assumed that the sounding bandwidths for the UL control channel resource dynamic change recognition-capable UE ("knowing UE' in FIG. 5 or first type UE) and incapable UE ("ignorant UE" in FIG. 5 or second type UE) are configured with 20 RBs and 16 RBs respectively. Here, the RB means a resource allocation unit consisting of 12 subcarriers. Also, it is assumed that the bandwidth of the SRS transmitted by each UE is set to 4 RBs.

The ignorant UE transmits its SRS 500 in the 160-RB band configured therefore. If frequency hopping is possible in the sounding bandwidth, the SRS 500 is transmitted on the whole frequency region in the sounding bandwidth while frequency-hopping at every SRS transmission timing as indicated by arrows.

The knowing UE transmits its SRS 501 in the 20-RB band configured for the knowing UE. As described above, if the frequency hopping is possible in the sounding bandwidth, the SRS 501 is transmitted on the whole frequency region in the sounding bandwidth while frequency-hopping at every SRS transmission timing. Here, the arrows for indicating the frequency hopping are omitted for convenience.

Here, it may occur that the 4-RB length SRSs 550 and 501 of the two UEs overlap in part. That is, the SRSs are overlapped as many as 2 RBs other than aligned as many as 4 RBs. In order to multiplexing the SRSs of the two UEs without interference, it is necessary to allocate different subcarrier use informations (comb), i.e. comb0 and comb1, to the respective UEs. For example, the ignorant UE is allocated the comb0, and the knowing UE the comb1. As described above, the comb0 and comb1 use the even-numbered subcarriers and the odd-numbered subcarriers respectively, no mutual interference occur.

The information for multiplexing the SRS signals of the two UEs without mutual interference (comb in FIG. 5, i.e. subcarrier use information) may be transmitted from the base station to the UEs through separate signaling.

Figure 6:
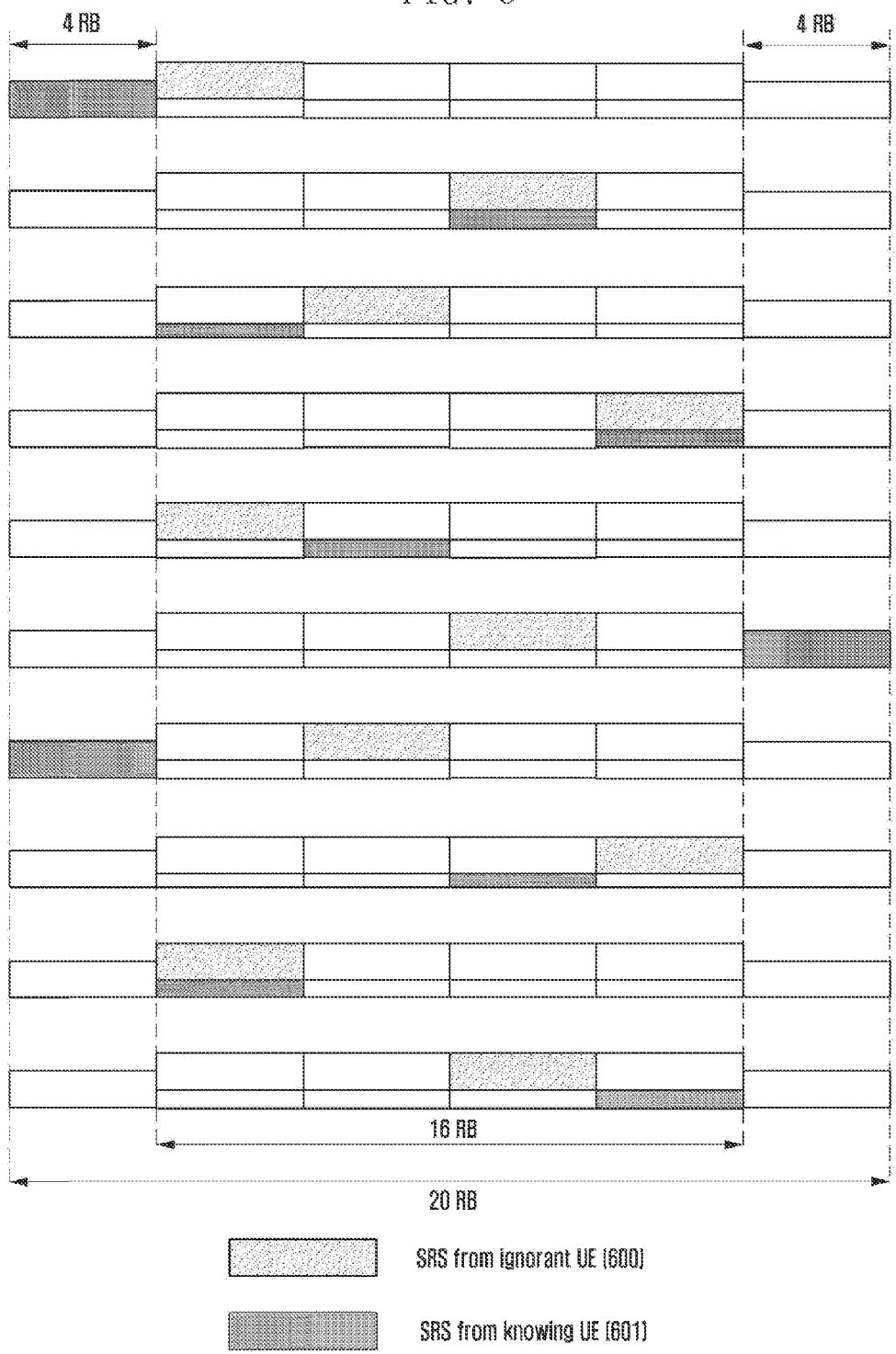
FIG. 6 is a diagram illustrating exemplary known UE and ignorant UE SRS multiplexing on the radio communication UL control channel resource according to another embodiment of the present invention.

FIG. 6 is a diagram illustrating exemplary known UE and ignorant UE SRS multiplexing on the radio communication UL control channel resource according to another embodiment of the present invention.

In FIG. 6, it is assumed that the sounding bandwidths for the UL control channel resource dynamic change recognition-capable UE ("knowing UE" in FIG. 6 or first type UE) and incapable UE ("ignorant UE" in FIG. 6 or second type UE) are configured with 20 RBs and 16 RBs respectively. It is also assumed that the SRS is capable of frequency-hopping and the SRS bandwidth is set to 4 RBs.

The ignorant UE transmits its SRS 600 in the configure 16-RB band and performs sounding on the whole frequency region in the sounding band while frequency-hopping at every SRS transmission time. Here, the arrows for indicating the frequency hopping are omitted for convenience.

The knowing UE transmits its SRS 601 in the configured 20-RB band. The SRS 601 is transmitted on the whole frequency region in the sounding band while frequency-hopping at every SRS transmission timing.

Unlike FIG. 5, it may occur that the SRSs of the two UEs which have the length of 4 RBs are aligned to overlap in the embodiment of FIG. 6. At this time, in order to multiplexing the SRSs of the two UEs without mutual interference, it may be considered to allocate different combs, i.e. comb0 and comb1, to the respective UEs as in FIG. 5. Also, the SRSs of the two UEs may be multiplexed with the same comb without mutual interference by allocating different cyclic shift values to the respective UEs.

In the current 3GPP standard, the Zadoff-chu sequence generating SRS may have 8 cyclic shift values which do not generate the sequences without mutual interference. For example, it is possible to allocate the cyclic shifts 0, 2, 4, and 6 to the ignorant UE and the cyclic shifts 1, 3, 5, and 7 to the knowing UE.

The information for multiplexing the SRSs of the two UEs without mutual interference (comb in FIG. 6, i.e. subcarrier use information or cyclic shift information) may be informed to the UEs through separate signaling.

Figure 7:
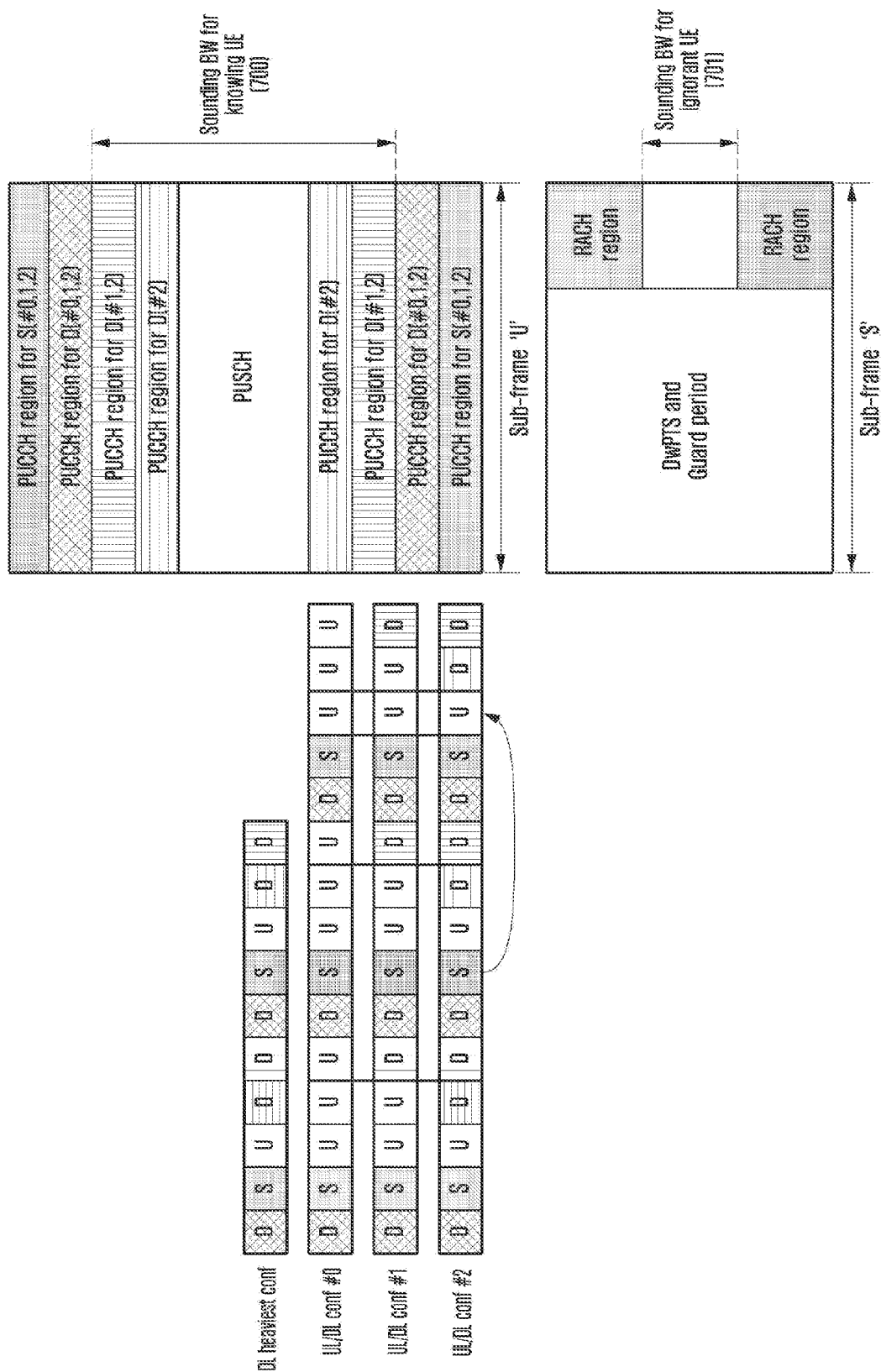
FIG. 7 is a diagram illustrating the knowing UE and ignorant UE SRS multiplexing on the UL control channel resource in a wireless communication according to an embodiment of the present invention.

FIG. 7 is a diagram illustrating the knowing UE and ignorant UE SRS multiplexing on the UL control channel resource in a wireless communication according to an embodiment of the present invention.

Referring to FIG. 7, the respective sounding bandwidths 700 and 701 for the UL control channel resource dynamic change recognition-capable terminal ("knowing UE" in FIG. 7) and the recognition-incapable terminal ("ignorant UE") are configured differently. However, the SRS transmission subframe is configured such that the two UEs do not transmit SRS at the same subframe.

For example, it is configured that the SRS of the knowing UE is transmitted at UL subframes and the SRS of the ignorant UE is transmitted at special subframes. The special subframe includes the beginning symbols as a DL signal transmission period and a guard period and the rest symbols as a UL signal transmission period.

The sounding band of the knowing UE is the same as described above but, in the case of the ignorant UE, the SRS can be transmitted in the UL signal transmission period of the special subframe, and the region excluding the Physical Random Access Channel (PRACH) transmission region for random access of the UE is configured as the sounding band.

The information for multiplexing the SRSs of the two UEs without mutual interference (information on the subframes for the respective UEs to transmit the SRSs in FIG. 7) may be informed by the base station to the UEs through separate signaling. here, it is possible to configure the SRS transmission-available subframe is to be the UL or special subframe in a radio frame according to whether the UE has the dynamic change recognition capability.

Figure 8:
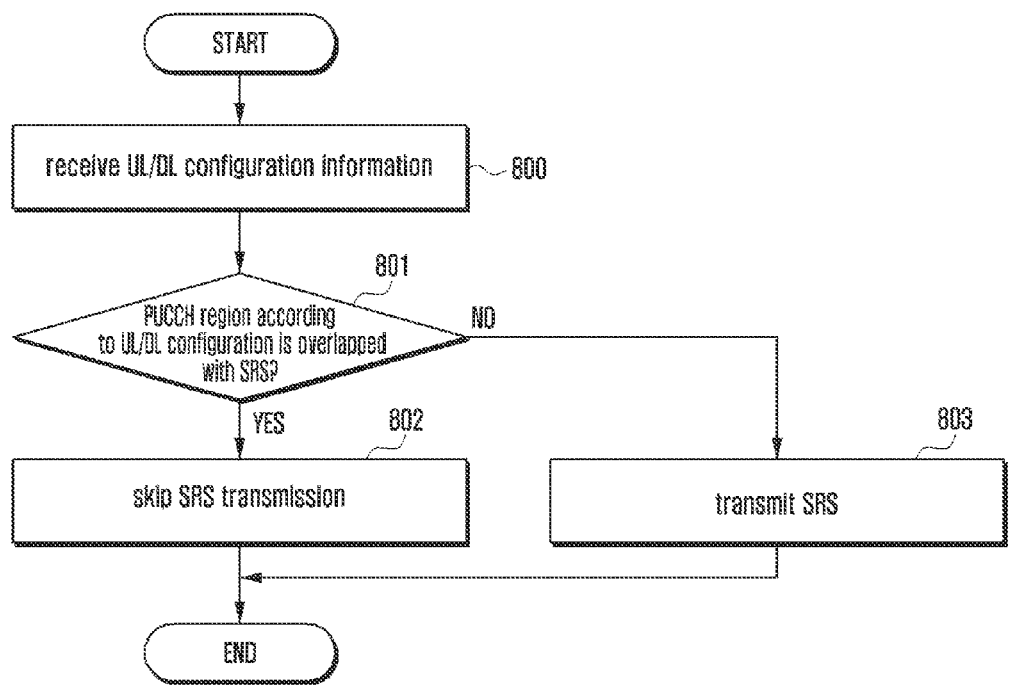
FIG. 8 is a flowchart illustrating a knowing UE procedure for receiving the UL/DL configuration from the base station and transmitting SRS to the base station in a wireless communication system according to an embodiment of the present invention.

FIG. 8 is a flowchart illustrating a knowing UE procedure for receiving the UL/DL configuration from the base station and transmitting SRS to the base station in a wireless communication system according to an embodiment of the present invention.

Referring to FIG. 8, the UE receives the information on the UL/DL configuration from the base station at step 800. The UE determines whether the PUCCH resource region indicated in the received UL/DL configuration is overlapped with its SRS at step 801. Here, determining whether the PUCCH resource region is overlapped with SRS means in detail determining whether the PUCCH resource region is overlapped with the SRS resource region for the UE to perform transmission currently. Also, if a collision occurs, this means that the PUCCH resource region is overlapped with the SRS resource region for the UE to transmit the SRS currently in the sounding band in whole or in part.

If it is determined that collision occurs, the corresponding UE skips SRS transmission at step 802. That is, the UE does not transmit SRS at the corresponding timing. If it is determined that no collision occur, the corresponding UE transmits SRS at step 803. Afterward, the UE ends the algorithm according to the present invention.

Figure 9:
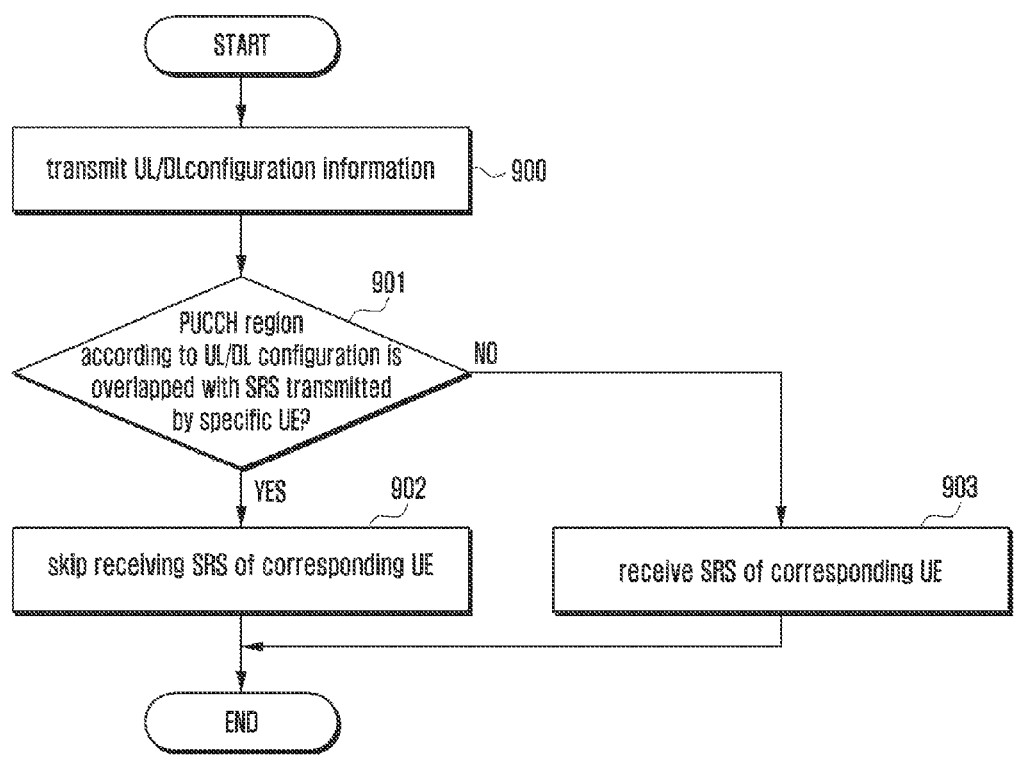
FIG. 9 is a flowchart illustrating the base station operation procedure of transmitting UL/DL configuration to the UE and receiving SRS transmitted by the UE in a wireless communication system according to an embodiment of the present invention.

FIG. 9 is a flowchart illustrating the base station operation procedure of transmitting UL/DL configuration to the UE and receiving SRS transmitted by the UE in a wireless communication system according to an embodiment of the present invention.

Referring to FIG. 9, the base station transmits the UL/DL configuration to the UEs within the cell at step 900. The base station determines whether there is a collision between the PUCCH resource region indicated in the UL/DL configuration and the SRS transmitted by the specific knowing UE at step 901.

If it is determined that there is a collision, the base station skips receiving the SRS of the knowing UE on the corresponding control channel resource at step 902. That is, the base station does not receive the SRS from the UE at the corresponding timing.

If it is determined that there is no collision, the base station receives the SRS of the knowing UE on the corresponding UL control channel at step 903. Afterward, the base station ends the algorithm according to the present invention.

Figure 10:
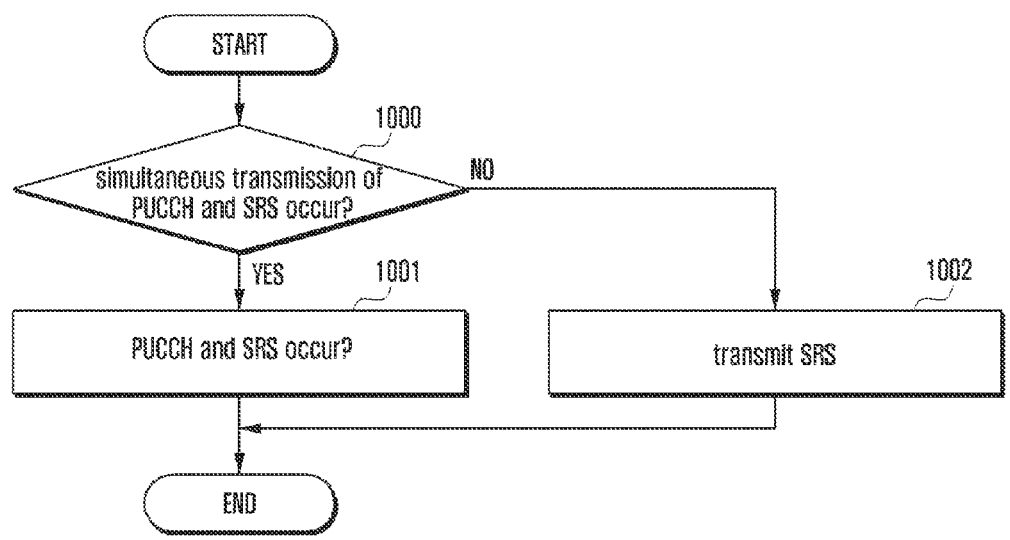
FIG. 10 is a flowchart illustrating the knowing UE operation procedure of determining whether the UL control channel and SRS are transmitted simultaneously or in the same subframe on the UL control channel resource for transmitting SRS in a wireless communication system according to an embodiment of the present invention.

FIG. 10 is a flowchart illustrating the knowing UE operation procedure of determining whether the UL control channel and SRS are transmitted simultaneously or in the same subframe on the UL control channel resource for transmitting SRS in a wireless communication system according to an embodiment of the present invention.

Referring to FIG. 10, the UE determines whether its PUCCH and SRS are transmitted simultaneously at step 1000. If it is determined the signals are transmitted simultaneously, the UE skips SRS transmission at step 1001. That is, the UE does not transmit SRS at the corresponding timing.

Otherwise, if it is determined that the signal are not transmitted simultaneously, the UE transmits SRS. Afterward, the UE ends the algorithm according to the present invention.

Figure 11:
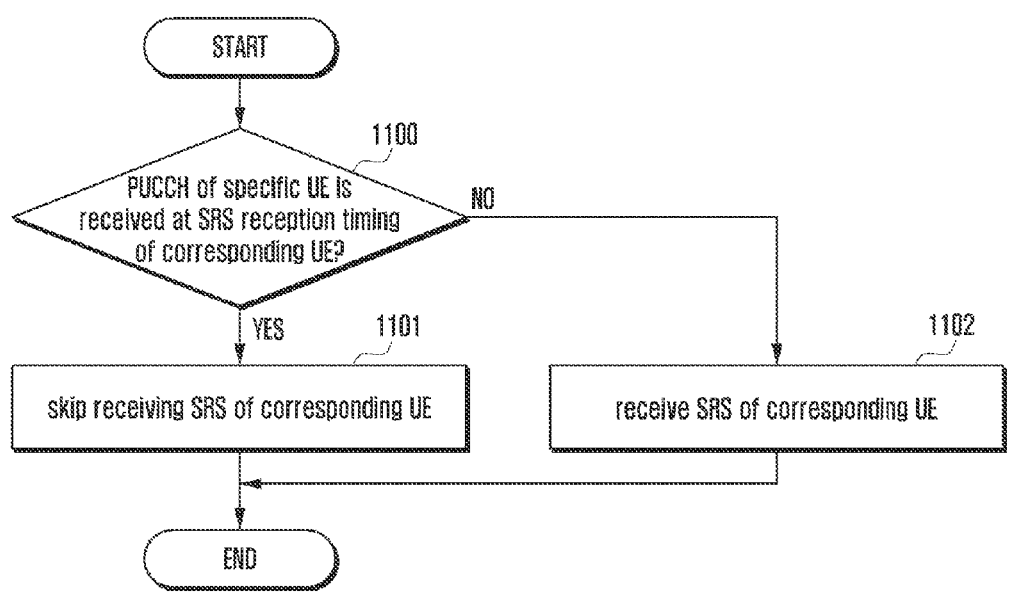
FIG. 11 is a flowchart illustrating the base station operation procedure of checking a simultaneous UL control channel and SRS reception timing to receive the SRS in a wireless communication system according to an embodiment of the present invention.

FIG. 11 is a flowchart illustrating the base station operation procedure of checking a simultaneous UL control channel and SRS reception timing to receive the SRS in a wireless communication system according to an embodiment of the present invention.

Referring to FIG. 11, the base station determines whether the SRS reception timing of a specific knowing UE matches the PUCCH reception timing of the corresponding UE at step 1100.

If it is the simultaneous SRS and PUCCH reception timing or reception timing in the same subframe, the base station skips receiving the SRS of the knowing UE on the corresponding control channel resource at step 1101.

Otherwise if it is neither the simultaneous SRS and PUCCH reception timing nor the reception timing in the same subframe, the base station receives the SRS of the knowing UE on the corresponding UL control channel resource.

Figure 12:
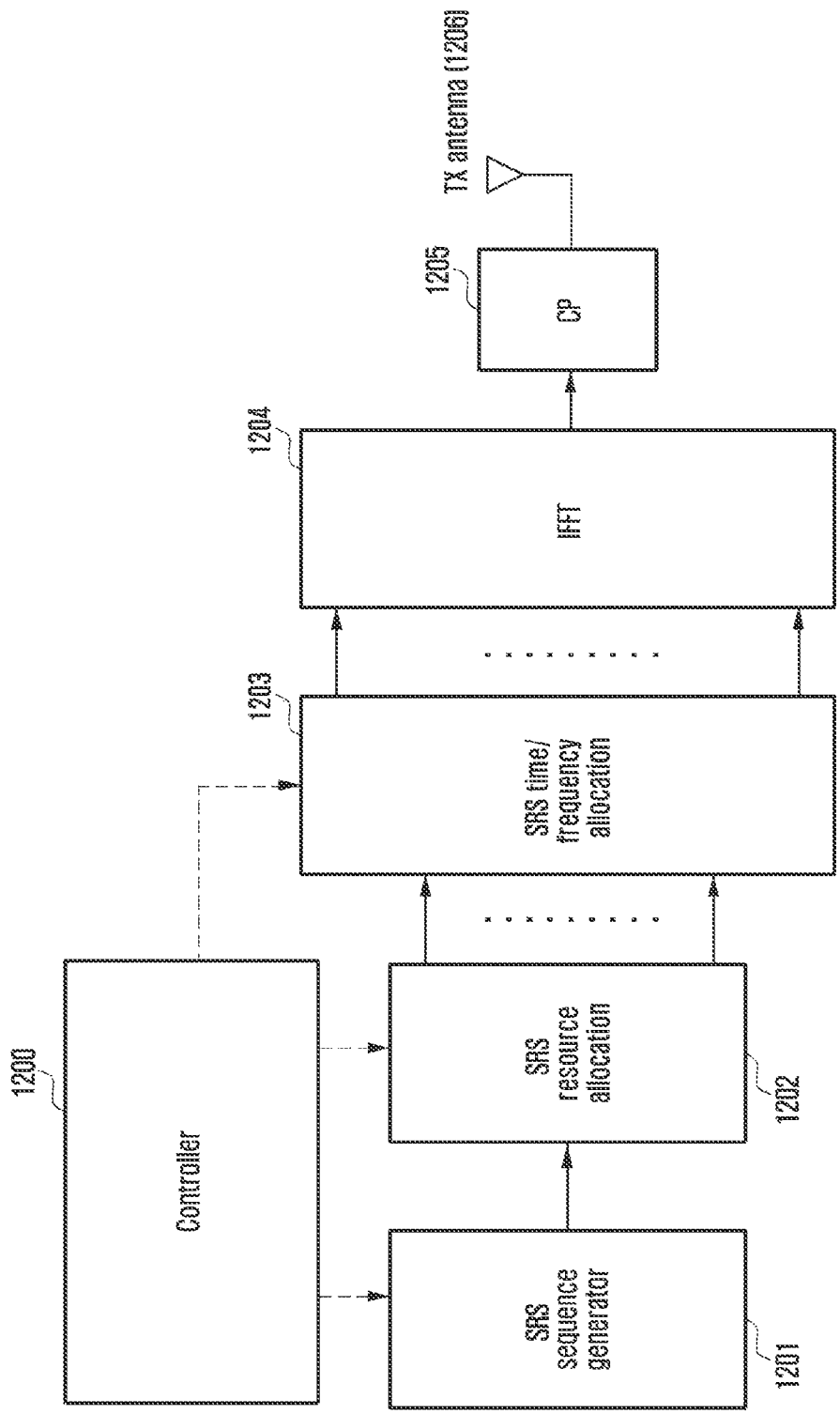
FIG. 12 is a block diagram illustrating a configuration of the knowing UE for transmitting SRS in a wireless communication system according to an embodiment of the present invention.

FIG. 12 is a block diagram illustrating a configuration of the knowing UE for transmitting SRS in a wireless communication system according to an embodiment of the present invention.

Referring to FIG. 12, the controller 1200 of the UE controls the UE to generate an SRS sequence and allocating SRS frequency location and resource. The controller 1200 performs the above control based on the cell-common/UE-specific SRS configuration information and UL/DL configuration information received from the base station and the determination result of the UE about whether to transmitting SRS or not which is made based on the received information.

In more detail, the controller 1200 controls to receive the UL/DL configuration transmitted by the base station. The base station 1200 determines whether the Physical Uplink Control Channel (PUCCH) resource region according to the UL/DL configuration is overlapped with the Sounding Reference Signal (SRS) resource region. If they are overlapped, the controller 1200 controls to skip the SRS transmission. If they are not overlapped, the controller 1200 controls to transmit SRS.

The controller 1200 also may control to receive the sounding band configuration information from the base station. In this case, if the UL is the knowing UE, the sounding band configuration information instructs to configure the resource region excluding the PUCCH resource region required according to the UL/DL configuration including the largest number of UL subframes as the sounding band of the UE.

If it is determined that the PUCCH resource region and the SRS resource region are overlapped, the controller 1200 determines whether the PUCCH resource region and the SRS are overlapped based on the resource region index (or 'm') of PUCCH. The controller 1200 also may determine whether the PUCCH resource region and the SRS are overlapped according to a rule selected depending on the UL/DL configuration (e.g. a table recording the PUCCH resource regions for the respective UL/DL configurations).

The controller 1200 may receive the SRS multiplexing information from the base station. In this case, the SRS multiplexing information may include at least one of sub-carrier use information for SRS transmission, cyclic shift information, and SRS transmission subframe information.

The SRS sequence generator 1201 generates the SRS sequence to be transmitted by the UE, and the SRS sequence is allocated SRS resource for multiplexing SRSs of multiple UEs at the SRS resource allocator 1202. Here, the SRS resource for multiplexing includes comb selection and cyclic shift allocation, and the SRS resource is allocated under the control of the controller 1200. At this time, the UL control channel resource region dynamic change recognition capability may be included as one of the SRS resource determination factors. The output of the SRS resource allocator 1202 is input to the SRS time/frequency allocator 1203.

The SRS time/frequency allocator 1203 determines a location of the SRS on the time and frequency resource axes. The location on the time axis may be the last symbol of the UL subframe configured for SRS transmission or one or two symbols (determined depending on the base station configuration) of the UL transmission part of the special subframe configured for SRS transmission of the UE. Afterward, the SRS is processed through the Inverse Fast Fourier Transform (IFFT) 1204 and Cyclic Prefix (CP) inserter 1205 and then transmitted to the base station through the transmission antenna 1206 (or transceiver) of the UE. FIG. 12 is directed to the case of using the single transmission antenna, and the serial-to-parallel and parallel-to-serial convertors are omitted for convenience purpose.

Figure 13:
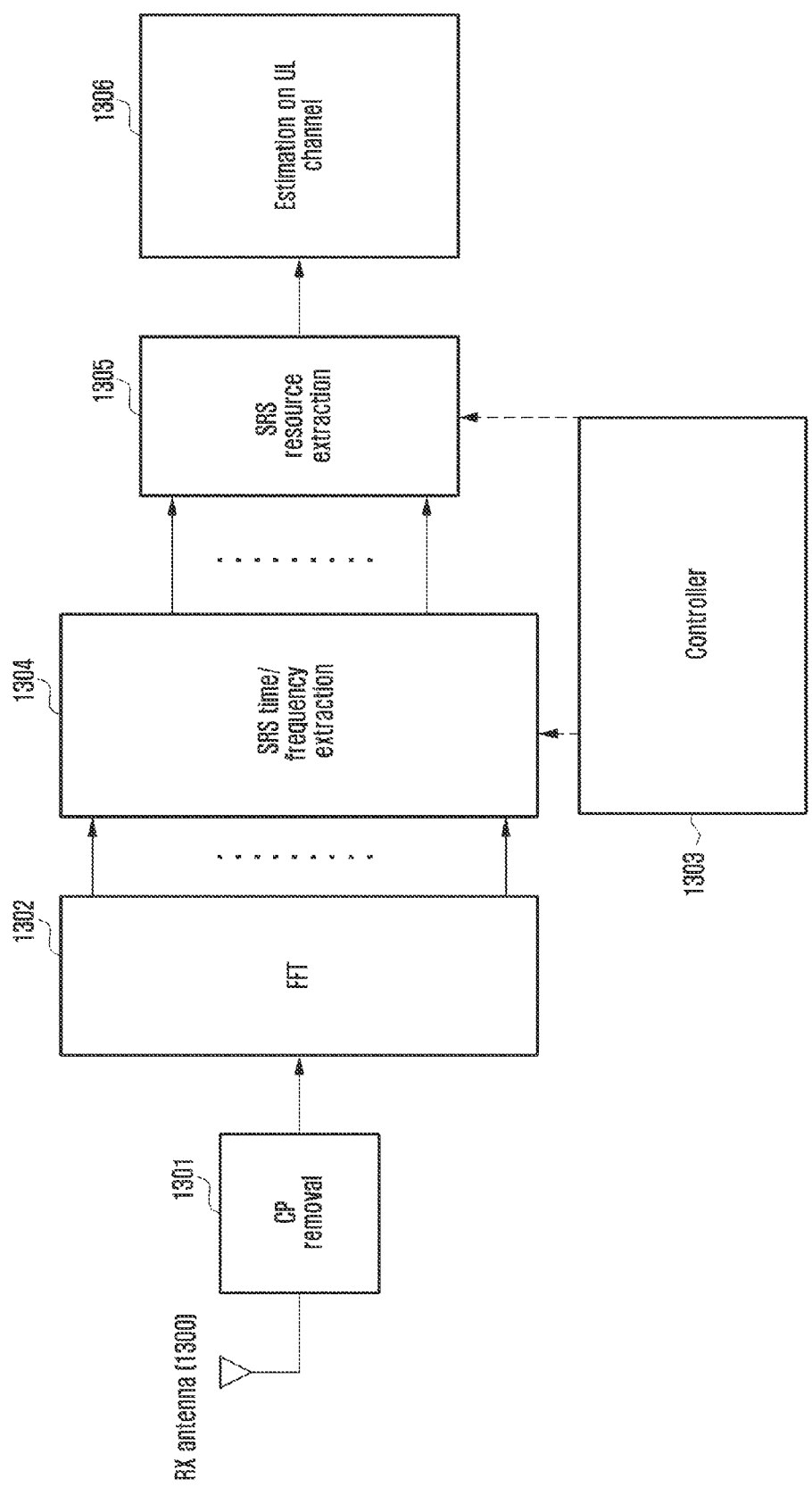
FIG. 13 is a block diagram illustrating a configuration of the base station for receiving SRS in a wireless communication system according to an embodiment of the present invention.

FIG. 13 is a block diagram illustrating a configuration of the base station for receiving SRS in a wireless communication system according to an embodiment of the present invention.

Referring to FIG. 13, the base station receives a signal including SRS through the reception antenna 1300 (or transceiver). The received signal passes the CP remover 1301 and the Fast Fourier Transform (FFT) 1302. The controller 1303 of the base station performs SRS extraction and UL channel state estimation based on the cell-common/UE-specific SRS configuration information and UL/DL configuration information transmitted to the UEs within the cell and the prediction on the result of the knowing UE's determination of whether to transmit SRS.

Here, the base station is capable of predicting the knowing UE's determination result of whether to transmit SRS because the UL control channel resource region according to the UL/DL configuration is agreed between the base station and the knowing UE and the location of the SRS transmitted by the UE on the time/frequency resource and the SRS resource allocation information are known in the configuration procedure of the base station.

A description is made of the operation of the controller 1303 in more detail hereinafter. The controller controls to transmit the UL/DL configuration to the UE. The controller 1303 determines whether the Physical Uplink Control Channel (PUCCH) resource region according to the UL/DL configuration is overlapped with the Sounding Reference Signal (SRS) to be transmitted by the UE. If overlapped, the controller 1303 controls to skip receiving the SRS.

The control unit 1303 may control to transmit at least one of the sounding band configuration informations for the knowing UE and the ignorant UE. In this case, the sounding band configuration information for the knowing UE instructs to configure the resource region excluding the PUCCH resource region required according to the UL/DL configuration including the largest number of UL subframes as the sounding band of the UE. Also, the sounding band configuration information for the ignorant UE instructs to configure the resource region excluding the PUCCH resource region required according to the UL/DL configuration including the largest number of DL subframes as the sounding band of the UE.

The controller 1303 also may determine whether the PUCCH resource region is overlapped with SRS based on the resource region index of PUCCH. The controller 1303 also may determine whether the PUCCH resource region is overlapped with SRS according to a rule selected depending on the UL/DL configuration (e.g. a table recording the PUCCH resource regions for the respective UL/DL configurations).

The controller 1303 also may control to transmit SRS multiplexing information to the UE. In this case, the SRS multiplexing information may include at least one of sub-carrier use information for SRS transmission, cyclic shift information, and SRS transmission subframe information.

FIG. 13 is directed to the case of using the single reception antenna, and the serial-to-parallel and parallel-to-serial convertors are omitted for convenience purpose.

Although the description has been made with reference to particular embodiments, the present invention can be implemented with various modifications without departing from the scope of the present invention. Thus, the present invention is not limited to the particular embodiments disclosed but will include the following claims and their equivalents.

The invention claimed is:

1. A sounding reference signal transmission method of a terminal in a wireless communication system, the method comprising:
   receiving time division duplexing (TDD) configuration information;
   receiving changed TDD configuration information;
   determining whether physical uplink control channel (PUCCH) resource and a sounding reference signal (SRS) are overlapped based on a PUCCH resource index;
   determining, when the PUCCH resource indicated by the PUCCH resource index mismatches the PUCCH resource indicated in the changed TDD configuration information, whether the PUCCH resource indicated in the changed TDD configuration information is overlapped with the SRS; and
   skipping, when the PUCCH resource indicated in the changed TDD configuration information is overlapped with the SRS, transmission of the SRS.

2. The method of claim 1, further comprising receiving sounding band configuration information from the base station,
   wherein receiving the sounding band configuration information comprises receiving the sounding band configuration information instructing to configure resource excluding the PUCCH resource required according to configuration information having the largest number of uplink subframes as a sounding band of the terminal.

3. The method of claim 1, wherein determining whether the PUCCH resource overlapped with the SRS comprises determining whether the PUCCH resource determined according to a table generated based on the changed TDD configuration information is overlapped with the SRS.

4. The method of claim 1, further comprising receiving SRS multiplexing information from the base station,
   wherein the SRS multiplexing information comprises at least one of SRS transmission subcarrier use information, cyclic shift information, and SRS transmission subframe information.

5. The method of claim 1, further comprising transmitting, when the PUCCH resource is not overlapped with the SRS, the SRS.

6. A terminal for transmitting a sounding reference signal in a wireless communication system, the terminal comprising:
   a transceiver configured to transmit and receive signals to and from a base station; and
   at least one computer processor configured to:
      receive time division duplexing (TDD) configuration information,
      receive changed TDD configuration information,
      determine whether physical uplink control channel (PUCCH) resource and a sounding reference signal (SRS) are overlapped based on a PUCCH resource index,
      determine, when the PUCCH resource indicated by the PUCCH resource index mismatches the PUCCH resource indicated in the changed TDD configuration information, whether the PUCCH resource indicated in the changed TDD configuration information is overlapped with the SRS,
      and skip, when the PUCCH resource indicated in the changed TDD configuration information is overlapped with the SRS, SRS transmission.

7. The terminal of claim 6, wherein the at least one computer processor is further configured to receive sounding band configuration information from the base station, the sounding band configuration information instructs to configure resource excluding the PUCCH resource required according to configuration information having the largest number of uplink subframes as a sounding band of the terminal.

8. The terminal of claim 6, wherein the at least one computer processor is further configured to:
  determine whether the PUCCH resource determined according to a table generated based on the changed TDD configuration information is overlapped with the SRS, and
  control the transceiver to receive SRS multiplexing information from the base station, the SRS multiplexing information including at least one of SRS transmission subcarrier use information, cyclic shift information, and SRS transmission subframe information.

9. A sounding reference signal reception method of a base station in a wireless communication system, the method comprising:
  transmitting time division duplexing (TDD) configuration information;
  transmitting changed TDD configuration information;
  determining whether physical uplink control channel (PUCCH) resource and a sounding reference signal (SRS) are overlapped based on a PUCCH resource index;
  determining, when the PUCCH resource indicated by the PUCCH resource index mismatches the PUCCH resource indicated in the changed TDD configuration information, whether the PUCCH resource indicated in the changed TDD configuration information is overlapped with the SRS; and
  skipping, when the PUCCH resource indicated in the changed TDD configuration information is overlapped with the SRS, reception of the SRS.

10. The method of claim 9, further comprising transmitting sounding band configuration information for at least one of a first terminal capable of identifying the changed TDD configuration information and a second terminal incapable of identifying the changed TDD configuration information,
  wherein the sounding band configuration information for the first terminal instructs resource excluding the PUCCH resource required according to configuration information including largest number of uplink subframes as the sounding band for the terminal, and the sounding band configuration information for the second terminal instructs resource excluding the PUCCH resource required according to configuration information including largest number of downlink subframes as the sounding band of the terminal.

11. The method of claim 9, wherein determining whether the PUCCH is overlapped with the SRS comprises determining whether the PUCCH resource determined according to a table generated based on the changed TDD configuration information is overlapped with the SRS.

12. The method of claim 9, further comprising transmitting SRS multiplexing information to the terminal,
  wherein the SRS multiplexing information comprises at least one of SRS transmission subcarrier use information, cyclic shift information, and SRS transmission subframe information.

13. A base station for receiving a sounding reference signal in a wireless communication system, the base station comprising:
  a transceiver configured to transmit and receive signals to and from a terminal; and
  at least one computer processor configured to:
    transmit time division duplexing (TDD) configuration information,
    transmit changed TDD configuration information;
    determine whether physical uplink control channel (PUCCH) resource and a sounding reference signal (SRS) are overlapped based on a PUCCH resource index, and
    determine, when the PUCCH resource indicated by the PUCCH resource index mismatches the PUCCH resource indicated in the changed TDD configuration information, whether the PUCCH resource indicated in the changed TDD configuration information is overlapped with the SRS,
    and
    skip, when the PUCCH resource indicated in the changed TDD configuration information is overlapped with the SRS, receiving the SRS.

14. The base station of claim 13, wherein the at least one computer processor is further configured to transmit sounding band configuration information for a first terminal capable of identifying the changed TDD configuration information and a second terminal incapable of identifying the changed TDD configuration information,
  wherein the sounding band configuration information for the first terminal instructs resource excluding the PUCCH resource required according to configuration information including largest number of uplink subframes as sounding band for the terminal, and the sounding band configuration information for the second terminal instructs resource excluding the PUCCH resource required according to configuration information including largest number of downlink subframes as the sounding band of the terminal.

15. The base station of claim 13, wherein the at least one computer processor is further configured to determine whether the PUCCH resource determined according to a table generated based on the changed TDD configuration information is overlapped with the SRS.

16. The base station of claim 13, wherein the at least one computer processor is further configured to transmit SRS multiplexing information to the terminal,
  wherein the SRS multiplexing information comprises at least one of SRS transmission subcarrier use information, cyclic shift information, and SRS transmission subframe information.

* * * * *